(12) United States Patent
McLaughlin et al.

(10) Patent No.: US 8,780,895 B1
(45) Date of Patent: Jul. 15, 2014

(54) METHOD AND APPARATUS FOR DETECTING RELOCATION OF ENDPOINT DEVICES

(75) Inventors: Robert J. McLaughlin, Allentown, NJ (US); Ali M. Cherchali, Ocean, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1488 days.

(21) Appl. No.: 11/744,728

(22) Filed: May 4, 2007

(51) Int. Cl.
  *H04L 12/66* (2006.01)
  *H04M 3/42* (2006.01)
  *G06F 15/173* (2006.01)

(52) U.S. Cl.
  USPC ....... 370/356; 709/223; 370/352; 379/207.12

(58) Field of Classification Search
  USPC ............ 370/356, 352; 455/411, 402.1, 404.2, 455/456.5; 709/223; 379/207.12
  See application file for complete search history.

(56) References Cited

U.S. PATENT DOCUMENTS

| | | | |
|---|---|---|---|
| 8,401,003 B1 * | 3/2013 | Petit-Huguenin et al. | 370/352 |
| 2005/0190158 A1 * | 9/2005 | Casebolt et al. | 345/166 |
| 2005/0232164 A1 * | 10/2005 | Anzarouth et al. | 370/255 |
| 2007/0070990 A1 * | 3/2007 | Chong et al. | 370/356 |
| 2007/0147345 A1 * | 6/2007 | Lowmaster | 370/352 |
| 2008/0120402 A1 * | 5/2008 | Brown | 709/223 |
| 2008/0200143 A1 * | 8/2008 | Qiu et al. | 455/404.2 |

* cited by examiner

*Primary Examiner* — Nicholas Jensen

(57) ABSTRACT

A method and an apparatus for detecting relocation of endpoint devices used for accessing services provided on packet networks, such as Voice over Internet Protocol (VoIP) networks are disclosed. For example, the method receives a report of a detected inertial movement of a customer endpoint device, and the method then uses the report of the detected inertial movement for determining whether a relocation of the customer endpoint device has occurred.

7 Claims, 5 Drawing Sheets

200

300 ns and, more particularly, to a method for detecting
METHOD AND APPARATUS FOR DETECTING RELOCATION OF ENDPOINT DEVICES The present invention relates generally to communication networks and, more particularly, to a method for detecting relocation of endpoint devices used for accessing services provided on packet networks, e.g., Voice over Internet Protocol (VoIP) networks.

BACKGROUND OF THE INVENTION

One of the advantages of obtaining services on an Internet Protocol (IP) based infrastructure is the flexibility of being able to access services from anywhere with an Internet connection. Namely, customers are provided with flexible services and can obtain the same service regardless of whether the call originated from a home, a hotel, a dormitory, etc. When a customer requests for a service, the customer's telephone number and device are associated with the service. For example, a Voice over Internet Protocol (VoIP) customer may relocate a telephone adaptor to a new location and access services while away from home. However, some services are provided based on the physical location of the caller. For example, calls to obtain emergency service, e.g., 911 calls, are routed to the closest center equipped to provide the emergency service. For example, in North America, when a customer dials 911, the Public Switched Telephone Network (PSTN) determines the caller's telephone number, associates the call with a location (address), and provides the telephone number and location of the caller to the appropriate Public Safety Answering Point (PSAP).

When 911 calls originate in a packet network such as a VoIP network, the VoIP service provider is required by the Federal Communications Commission (FCC) to determine the telephone number and physical location of the caller so that the information is sent to the proper PSAP through the PSTN network. For example, the VoIP service provider may obtain the service address when a customer subscribes to a VoIP service. However, due to the flexible nature of the VoIP service, the customer may at a later time move the customer endpoint device (terminal adaptor) to another physical location and continue accessing VoIP services. Thus, the address obtained during the service subscription may no longer be usable for calls that rely on the physical location of the caller, e.g., E911 calls. The VoIP service then cannot be provided to the customer at the new address while meeting the FCC requirements for E911 calls. Namely, if the service provider is capable of determining that the customer has changed his/her location, then the service provider may deny or interrupt access to the VoIP service until the customer provides a new valid physical address.

SUMMARY OF THE INVENTION

In one embodiment, the present invention discloses a method and apparatus for detecting potential relocation of a customer endpoint device, e.g., that is used to access network services, such as a Voice over Internet Protocol (VoIP) services. For example, the method receives a report of a detected inertial movement of a customer endpoint device, and the method then uses the report of the detected inertial movement for determining whether a relocation of the customer endpoint device has occurred.

In one embodiment, the method detects an inertial movement of a customer endpoint device, and then sends a report of the detected inertial movement to a network application server for determining whether a relocation of the customer endpoint device has occurred.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for detecting relocation of a customer endpoint device that is used to access a Voice over Internet Protocol (VoIP) service provided over packet networks. Although the present invention is discussed below in the context of VoIP services, the present invention is not so limited. Namely, the present invention can be applied for other services with mobile customers.

Figure 1:
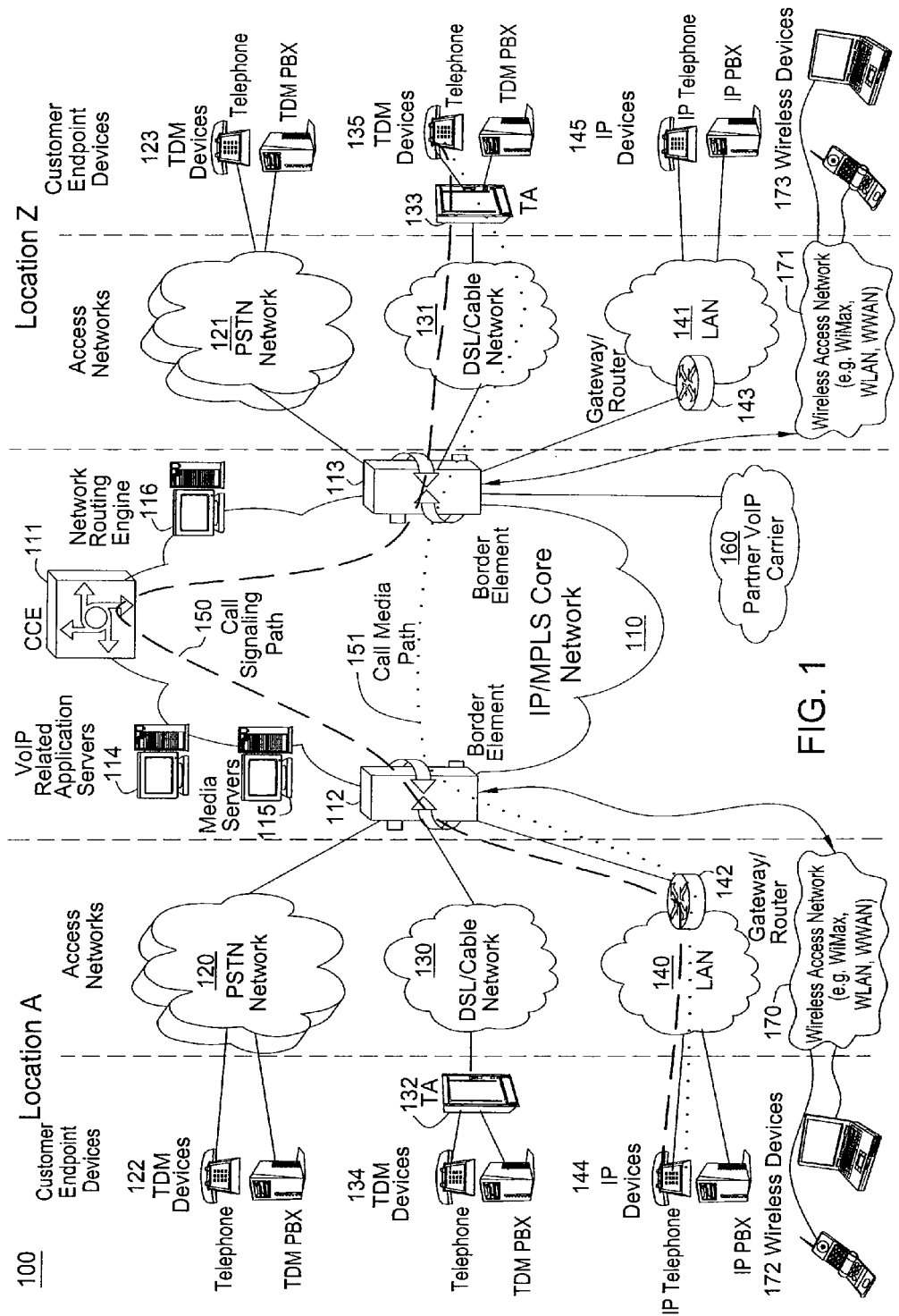
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as data packets over an IP network. The present invention is described below in the context of an illustrative VoIP network. Thus, the present invention should not be interpreted as limited by this particular illustrative architecture.

The customer endpoint devices can be Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173, typically comprise cellular phones, pocket PCs etc. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 which has a VoIP gateway router 142 or 143, as shown in FIG. 1. Wireless endpoint devices may access VoIP services by using wireless access networks 170 and 171. The wireless access networks 170 and 171 are connected to the IP core network 110 through the border elements 112 and 113, respectively.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access networks for wireless devices 170 and 171 can be Worldwide Interoperability for Microwave Access (WiMax), Wireless Local Area Networks (WLAN) or Wireless Wide Area Networks (WWAN).

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a soft-switch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, towards the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoint devices, the CCE 111 does not need to be in the data path for actual direct data exchange.

Media Servers (MS) 115 are special servers that typically handle and terminate media streams, and to provide services such as announcements, bridges, trans-coding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on packet networks, such as VoIP networks. One of the advantages of obtaining services on an Internet Protocol (IP) based infrastructure is the flexibility of being able to access services from anywhere with an Internet connection. When a customer requests for a service, the service provider associates the request with the customer's telephone number and device (e.g., a terminal adaptor). For example, when a customer initiates a call, the telephone service provider associates the received request with the telephone number assigned to the customer. One of the concerns customers have about relying on the IP based services for all voice and data services is the fact that some services need to be delivered based on the physical location of the user, but the call may be originated from any location with an Internet access. For example, calls for emergency services, e.g., to a fire department, a police station, etc. are intended to be received by an emergency service provider most likely to meet the emergency need. Namely, the emergency service providers closest to the caller should be called upon to provide the emergency service. To address this criticality, the present invention discloses a method and apparatus that detects relocation of a VoIP endpoint device.

In order to clearly illustrate the teachings of the current invention, the following terminologies will first be described:
911 call;

911 tandem;
Public Safety Answering Point (PSAP); and
Enhanced 911 (E911).

A 911 call refers to a telephone call placed for the purpose of requesting emergency services. For example, the public switched telephone network has been enabled to recognize specific telephone numbers as a call for emergency services. The telephone number used in North America is 911. The emergency call is delivered based on geographical location of the caller to a public safety answering point as defined below.

A 911 tandem refers to a switch that is used to connect telephone switching centers to the various public safety answering points. For example, when a wireless caller dials 911, the call is routed to a mobile switching center. The mobile switching center is connected to the 911 tandem that determines the public safety answering point that can best service the call and then routes the call accordingly.

Public Safety Answering Point (PSAP) refers to a location where emergency calls are received and distributed to the appropriate emergency services such as the fire department, ambulance service, police dispatch locations, etc. The services that belong in a particular PSAP vary by community. For example, the Incumbent Local Exchange Carrier (ILEC) manages the telephone equipment such as the 911 tandem that routes the call to the appropriate public safety answering point.

Enhanced 911 (E911) refers to an enhancement of technology required by the Federal Communications Commission (FCC) to enable mobile devices such as cellular phones to process 911 calls.

Emergency calls that require a Public Safety Answering Point (PSAP) are provided on the traditional PSTN network. The calls are delivered based on the geographical location of the caller to the closest PSAP. Regardless of the network used to initiate the 911 call, the 911 calls are eventually sent to the PSAP in the PSTN network.

A VoIP service provider may obtain a service address (e.g., a physical address) for a customer when the customer initially subscribes to the VoIP service. When the customer initiates a 911 call from the service address, the VoIP service provider identifies the caller, retrieves the caller's service address previously received from the customer, and forwards the address to the 911 tandem that is located in the PSTN network. The local exchange carrier with the PSTN network delivers the information from the 911 tandem to the proper PSAP. Depending on the specific implementation, the call, the telephone number, and/or the caller's service address (as provided during service subscription) flow from the VoIP service provider towards the public safety answering point.

In order to ensure that customers of VoIP service are able to reach emergency services, the FCC mandates VoIP services to be provided only at a location where E911 calls are supported. For example, service providers may restrict access to the VoIP service until a physical address is confirmed with the customer. For example, if a customer has a VoIP service at home, he/she may not be allowed to access the service from another location until the service provider is provided with an updated physical address. If a customer attempts to access the VoIP service from another location, the service provider may be required to deny access to the service until the updated physical address is obtained and verified.

In one embodiment, the current invention provides a customer endpoint device with the capability to detect inertial movement of the endpoint device (e.g., using one or more inertial sensors) and to record the movement (e.g., degree of motion and/or time and date of detected motion, and the like) in a memory device or module. The customer endpoint device may then report the content of the memory to the VoIP service provider at a later time. Since the customer endpoint device retains the inertial movement information until the information is subsequently provided to the VoIP service provider, the customer endpoint device is implemented with a secondary power source (e.g., a battery) for maintaining the content of the memory. It should be noted that the secondary power source is not required to power the entire endpoint device, but it should, at minimum, be sufficient to store and maintain the detected motion information in the memory. In one embodiment, only the VoIP service provider is able to reset the memory remotely, such that tampering with the endpoint device is minimized. For example, the VoIP service provider may retrieve information from the memory in a predetermined schedule and resets the memory once the information has been retrieved.

In one embodiment, the current invention may also monitor a power loss event, e.g., a soft reboot or a hard reboot, that may have been experienced by the endpoint device. A hard reboot involves removing the primary power supply from the endpoint device and then reapplied at a later time, whereas a soft reboot does not involves removing the primary power supply from the endpoint device, but the endpoint device is reset and restarted. It should be noted that a power loss event is not always a conclusive indication of a movement of the endpoint device. For example, disconnecting a primary power supply to an endpoint device by a user may be an indication of a relocation of the endpoint device. In contrast, a soft reboot of the endpoint device where the primary power supply is never lost may not indicate movement of the endpoint device. For example, a soft reboot may be initiated by the user or the VoIP service provider for resetting the endpoint device, e.g., due to configuration changes, software upgrade, etc.

In one embodiment, the customer endpoint device may contain a memory for tracking and reporting power loss events (e.g., the type of power loss, duration of power loss, time, date, and the like). For example, the customer endpoint device may contain one or more flags to be set when a reboot is performed on the customer endpoint device. In one embodiment, the customer endpoint device may report a power loss event autonomously to the service provider network. Alternatively, the VoIP service provider may retrieve the information associated with a power loss event in a predetermined schedule.

In one embodiment, the customer endpoint device may report a power loss event autonomously when a predetermined set of conditions are met. For example, a power loss event may be reported autonomously, when an inertial movement of the endpoint device is also recorded at the same time. This example illustrates that a power loss event coupled with the detection of an inertial movement event may potentially indicate that the endpoint device was moved to a new location, e.g., the user disconnecting the primary power supply and carrying the endpoint device on a business trip.

In one embodiment, the current invention may monitor an interruption in the regularity of commonly occurring messages. For example, the method may enable the endpoint device to originate "check-in" messages that are designed to be sent regularly to the network in a predetermined schedule (e.g., every hour, every 6 hours, every 12 hours, every 24 hours, and so on). In turn, the network is designed to monitor these "check-in" messages for interruption or alteration from the predefined schedule. For example, disconnecting and relocating an endpoint device will cause one or more "check-in" messages to be missed by the network. However, it should be noted that an interruption of commonly occurring messages event is not always a conclusive indication of a movement of the endpoint device. For example, the user may have simply turned off the endpoint device or the user's area is experiencing an extended period of power outage.

In one embodiment, the current invention may also monitor for unexpected change in an IP address. For example, if a customer relocates his/her endpoint device, the customer may attach the endpoint device to a router or an access modem at another location. When the customer originates a VoIP session, the IP address associated with the new location is then received. Since the service provider is monitoring this address parameter, the change in the IP address will be detected by the network. Again, it should be noted that a change in an IP address event is not always a conclusive indication of a movement of the endpoint device. Namely, the IP address may be altered for reasons other than relocation. For example, another IP address may be assigned to the user by his/her Internet Service Provider (ISP).

Figure 2:
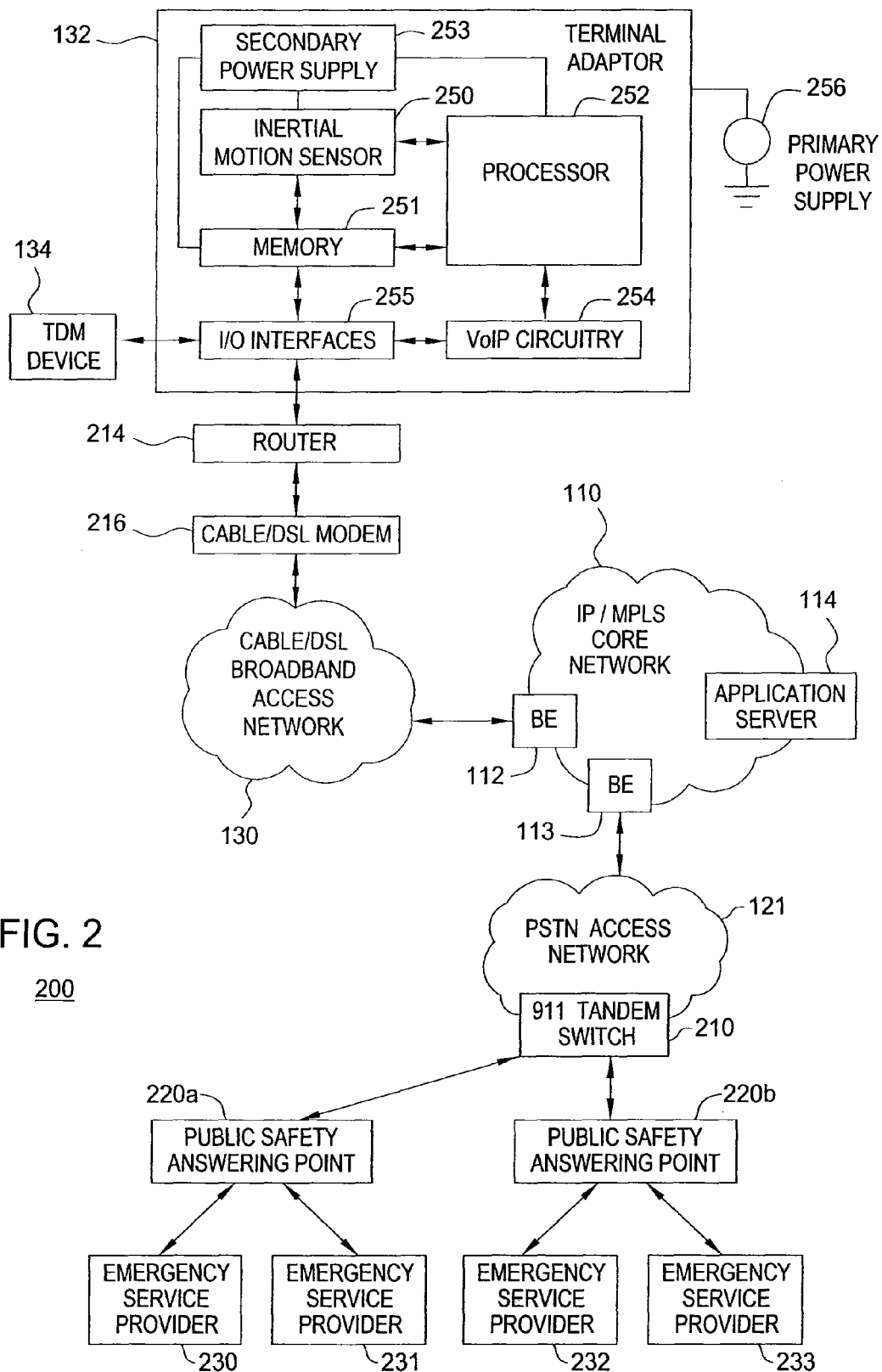
FIG. 2 illustrates an exemplary network with one embodiment of the present invention for detecting relocation of a customer endpoint device.

FIG. 2 illustrates an exemplary network 200 with one embodiment of the present invention for detecting relocation of VoIP customer endpoint devices. For example, a customer is using a TDM device 134 to originate a call, e.g., a 911 call. The TDM device 134 is connected to a terminal adaptor 132 and the terminal adaptor 132 is connected to a broadband cable or DSL modem 216 through an optional router 214 for communicating with an access network. For example, the broadband modem 216 is connected to a broadband DSL or cable access network 130. It should be noted that in an alternative embodiment, the terminal adaptor 132 as illustrated in FIG. 2 can be directly connected to the broadband modem 216 without the router 214.

In one embodiment, the terminal adaptor 132 (e.g., an endpoint device) may contain: an inertial motion sensor 250, a memory 251 for recording various information, e.g., movement and power loss information, a processor 252, a secondary power supply 253, a VoIP circuitry 254 for performing various TA functions, and I/O interfaces 255 for connecting to various devices, e.g., phones, LAN, router, etc. A primary power supply 256 is connected to the TA 132 for powering the TA. In one embodiment, the secondary power supply 253 is connected to the inertial motion sensor 250, the memory 251 and the processor 252 to enable the recording of movement information even when the primary power supply 256 is disconnected from the TA.

The packets transmitted by the TDM device 134 via the TA 132 traverse the access network 130 and reach an IP/MPLS core network 110 through a border element 112. The packets then traverse the core network 110 from border element 112 to a border element 113. In one embodiment, an application server, e.g., an application server 114, located in the IP/MPLS core network 110 is utilized for providing VoIP services to the users. Border element 113 is connected to a PSTN access network 121. The PSTN network routes the 911 call to a 911 tandem switch 210. In one embodiment, the 911-tandem switch is connected to a plurality of Public Safety Answering Points (PSAP) 220a and 220b. The 911 tandem switch forwards the 911 call to the closest public safety answering point based on the physical location of the caller. The public safety answering points 220a and 220b are, in turn, connected to the emergency service providers 230, 231, 232 and 233. Each community will determine the emergency services such as the local police department, ambulance service, fire department, and the like to be connected to the PSAP. Thus, a user using a TDM device 134 is able to originate an emergency call that will be routed to a proper PSAP that will be able to service the emergency call.

In one embodiment, if a user changes the physical location of the terminal adaptor, the terminal adaptor will detect the inertial movement and reports the detected movement to the application server 114 when the TA is subsequently activated, e.g., when the TA is used to access the VoIP service at a new physical location. In turn, the application server 114 is designed for interacting with a plurality of terminal adaptors to receive reports of various events, e.g., detected inertia movement, power loss, etc. The application server 114 then analyzes the received reports to determine whether or not the customer service should be intercepted until the physical address associated with the customer is again validated. For example, if the application server receives an inertial movement event, a power loss event associated with a hard reboot, an IP address change event, and an interruption of check-in messages event for a customer, then the service provider may have a high confidence that the customer has relocated the terminal adaptor. In turn, the service provider will intercept the VoIP service until the customer provides a valid new physical address indicating that the user is at the new physical address, or reconfirms an existing physical address indicating that the user is not at a new location. This approach will minimize false positives, thereby leading to greater customer satisfaction while meeting FCC mandates.

However, the amount of information that is gathered and used by the service provider to arrive at a conclusion that a customer is likely at a new physical location can be tailored to a particular deployment. For example, if the application server receives only a report of a hard reboot, then the application server may interact with the terminal adaptor to attempt to retrieve inertial motion information. If no inertia movement event was detected, then the service provider may determine that the received power loss event is not due to relocation, and decides not to intercept the VoIP service for the customer. In this illustrative example, the inertial motion information serves to be the deciding parameter.

Figure 3:
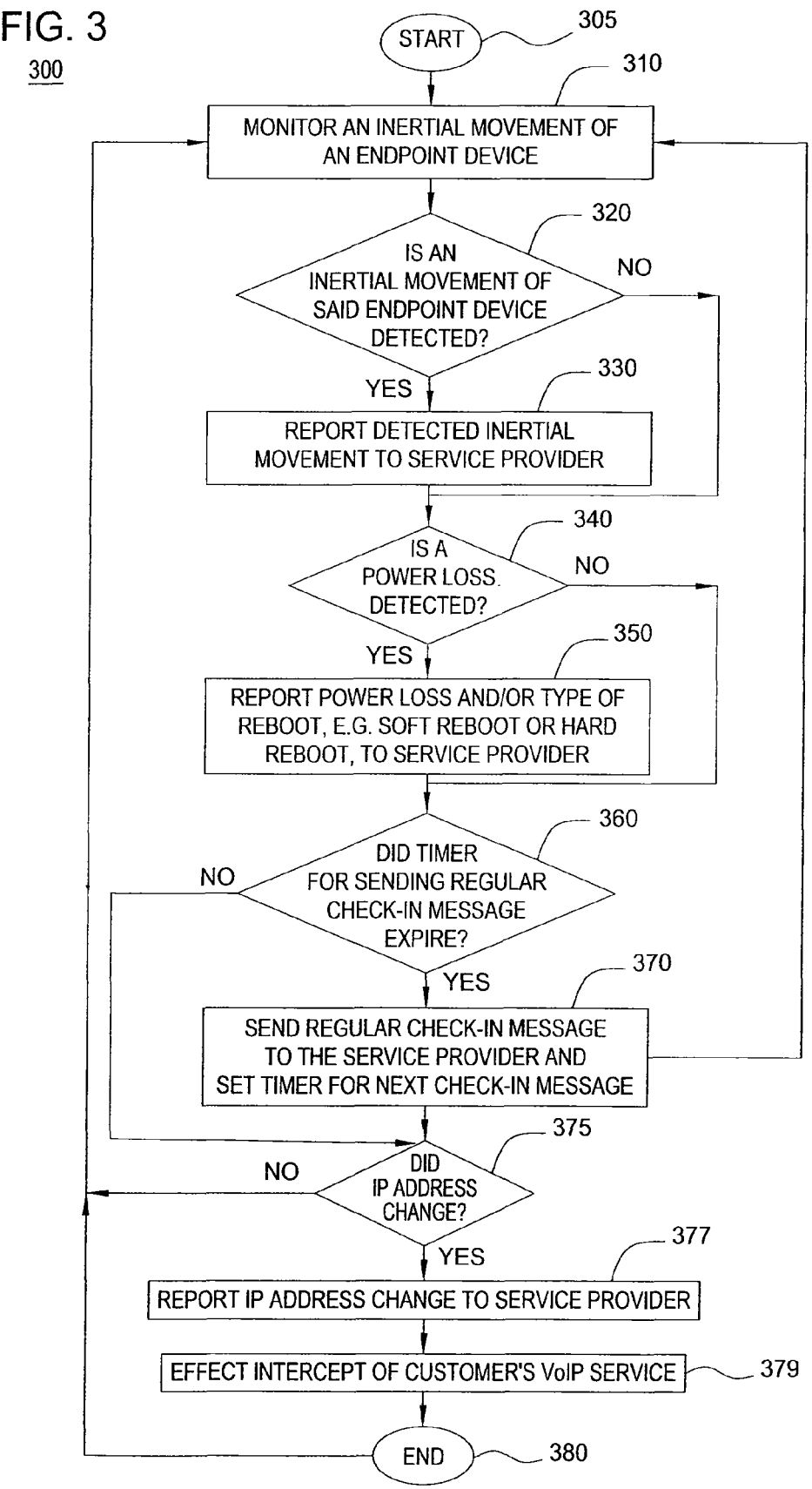
FIG. 3 illustrates a flowchart of a method for a customer endpoint device for detecting and reporting a relocation.

FIG. 3 illustrates a flowchart of a method 300 for detecting and reporting relocation of a customer endpoint device. Method 300 starts in step 305 and proceeds to step 310.

In step 310, method 300 monitors an inertial movement of an endpoint device. For example, a motion sensor within the endpoint device is used to detect an inertial movement. The endpoint device would then record any detected motion information in a memory for sending a report of the detected movement to the VoIP service provider at a later time, e.g., when the endpoint device is reactivated (i.e., connected to the network and power supply to initiate a VoIP call). Note that the motion may be detected while the endpoint device is disconnected from the network and/or the primary power supply.

In step 320, method 300 determines whether or not an inertial movement of the endpoint device is detected. For example, a flag may be set when an inertial movement is detected. The method may then check for the presence of the flag. If an inertial movement is detected, the method proceeds to step 330. Otherwise, the method proceeds to step 340.

In step 330, method 300 optionally reports the detected inertial movement to the service provider. For example, the method may immediately or at a later time send a message indicating that an inertial movement is detected to an application server in the service provider's network. Alternatively, this information can be requested by the service provider instead of requiring the endpoint device to forward such information on its own. The method then proceeds to step 340.

In step 340, method 300 determines whether or not a power loss is detected. For example, the method determines whether or not the primary power has been disconnected. A flag may be set to indicate a hard reboot has occurred for the device. In one embodiment, a separate flag may be set to indicate a soft reboot has occurred for the device. If a power loss event is detected, then the method proceeds to step 350. Otherwise, the method proceeds to step 360.

In step 350, method 300 optionally reports a power loss event and/or the type of power loss event to the service provider. For example, the method may immediately or at a later time send the status of the hard reboot and the soft reboot flags to an application server in the service provider's network. Alternatively, this information can be requested by the service provider instead of requiring the endpoint device to forward such information on its own. The method then proceeds to step 360.

In step 360, method 300 determines whether or not a timer for sending regular check-in messages has expired. For example, the endpoint device may be required to send a "check-in" message every 24 hours. The method then determines whether or not the 24 hours have elapsed since the previous message. In one embodiment, the service provider determines the frequency of check-in messages and configures the endpoint device with the duration/frequency when the customer subscribes to a VoIP service. If the timer for sending regular check-in messages has expired, then the method proceeds to step 370. Otherwise, the method proceeds to step 375.

In step 370, method 300 sends a check-in message to the service provider and sets a timer for sending the next check-in message. For example, the method sends a message according to a predetermined schedule.

In step 375, method 300 determines whether an IP address change has been detected. For example, the method may store a previous IP address that was used by the TA to access the customer's VoIP service. As such, when a user attempts to make a call, the method can compare whether an IP address that will be used to make the call is consistent with an IP address that was previously used. If there is a discrepancy, method 300 proceeds to step 377. Otherwise, method 300 proceeds to step 310.

In step 377, method 300 may optionally report back to the service provider that it is now using a different IP address to access the VoIP service. Alternatively, this information can be requested by the service provider instead of requiring the endpoint device to forward such information on its own. The method then proceeds to step 379.

In step 379, method 300 may optionally effect the interception or suspension of the customer's VoIP service. For example, the endpoint device can be implemented with the appropriate logic or control element to determine whether the presence of various information as discussed above will warrant a conclusion that the customer is accessing the VoIP service at a different physical location. If so, the endpoint device may actually send a message to the service provider to request a suspension of the customer's VoIP service. Alternatively, the endpoint device may actual intercept the customer's VoIP service by refusing to make the call until the customer is able to confirm the existing physical address or to provide a new physical address. Once the confirmation is received or a new physical address is provided, then the endpoint device may complete the call and also reports to the service provider of any changes or updates to the customer's physical address.

The method then proceeds to step 310 to continue monitoring for inertial movement or ends in step 380.

Figure 4:
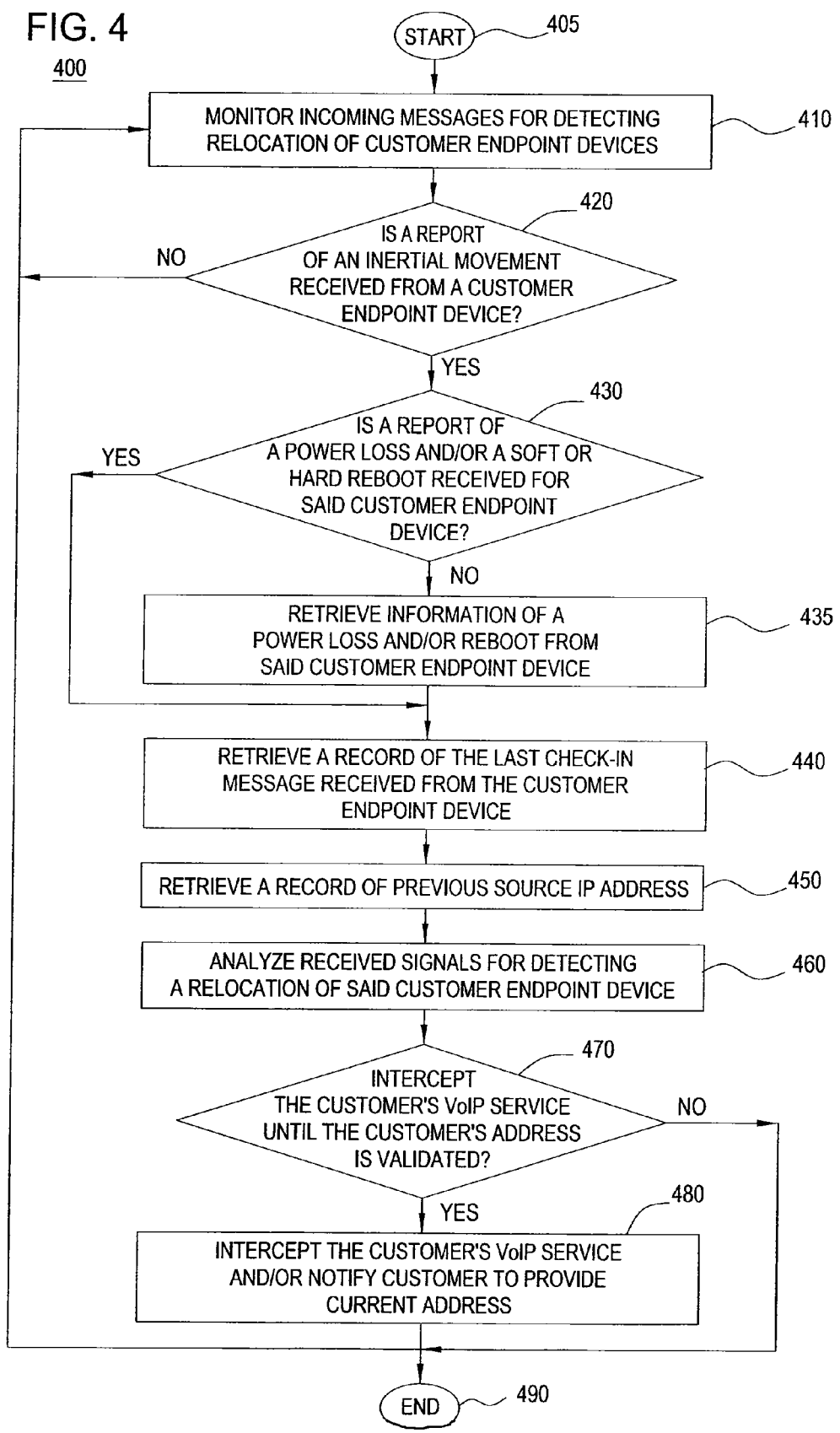
FIG. 4 illustrates a flowchart of a method for detecting relocation of a customer endpoint device.

FIG. 4 illustrates a flowchart of a method 400 for detecting relocation of an endpoint device. Method 400 starts in step 405 and proceeds to step 410.

In step 410, method 400 monitors incoming messages for detecting relocation of customer endpoint devices. For example, an application server may monitor incoming messages to determine whether a message indicating an inertial movement is being reported by a customer endpoint device.

In step 420, method 400 determines whether or not it received a report of a detected inertial movement from a customer endpoint device. If a report of a detected inertial movement is received, then the method proceeds to step 430. Otherwise, the method proceeds back to step 410 to continue monitoring incoming messages.

In step 430, method 400 optionally determines whether or not it received a report of a power loss event, e.g., a hard reboot. If a report of a power loss event is received, then the method proceeds to step 440. Otherwise, the method proceeds to step 435.

In step 435, method 400 may optionally retrieve additional information associated with the detected power loss event, e.g., the type of power loss event, the duration of the power loss, the time, and/or the date, from the customer endpoint device. For example, the method may interact with the customer endpoint device to retrieve the values of flags for soft reboot and hard reboot that may be set in the endpoint device. However, if the additional information is sent to the service provider automatically by the customer endpoint device, then step 435 can be omitted. The method then proceeds to step 440.

In step 440, method 400 retrieves a record of the last check-in message received from the customer endpoint device. For example, if a customer endpoint device sends regular check-in messages on an hourly basis, and the last check-in message was received two (2) days ago, it may be an indication of a relocation of the customer endpoint device.

In step 450, method 400 retrieves a record of a previous source IP address for the customer device for a comparison operation. For example, if a customer moved the endpoint device to a hotel and connected his/her endpoint device to the hotel's Internet connection, then the IP address received when the customer who is initiating a VoIP session from the new location should be different from the previous source IP address.

In step 460, method 400 analyzes the received information to determine whether or not a relocation of the customer's endpoint device is detected. In one embodiment, the method may simply use a report of a detected inertial movement to determine that a customer endpoint device has been relocated. In another embodiment, the method may utilize the report of a detected inertial movement, in conjunction with at least one of: a report of a power loss; a change or an interruption of regular check-in messages; or a change in the source IP address, to determine that a customer endpoint device has been relocated.

In step 470, method 400 determines whether or not to intercept the customer's VoIP service until the customer's physical address is again validated. The service provider may selectively determine the criteria that will be used to intercept the customer's VoIP service for address validation. For example, one service provider may require the presence of all the factors (e.g., inertial movement data, power loss data, interruption of check-in messages, and change of the source IP address) before service is to be intercepted. However, another service provider may base the decision to intercept service on the inertial movement data alone, and so on. If the service is to be intercepted, then the method proceeds to step 480. Otherwise, the method proceeds back to step 410 to continue the monitoring of received messages or ends in step 490.

In step 480, method 400 intercepts the customer's VoIP service and/or notifies the customer to provide a current physical address. For example, the customer may be notified that the network has potentially detected the relocation of the customer endpoint device and the service provider needs to obtain the current location for service to resume. The method then proceeds back to step 410 to continue the monitoring of received messages or ends in step 490.

It should be noted that the various steps as described above in FIGS. 3 and 4 do not necessarily limit the present invention in terms of the sequential order of these steps. Namely, these steps can be implemented in different orders without deviating from the scope of the present invention. Furthermore, some of the steps can be implemented in parallel.

It should be also noted that although not specifically specified, one or more steps of methods 300 and 400 may include a storing, displaying and/or outputting step as required for a particular application. In other words, any data, records, fields, and/or intermediate results discussed in the methods can be stored, displayed and/or outputted to another device as required for a particular application. Furthermore, steps or blocks in FIGS. 3 and 4 that recite a determining operation or involve a decision, do not necessarily require that both branches of the determining operation be practiced. In other words, one of the branches of the determining operation can be deemed as an optional step.

Figure 5:
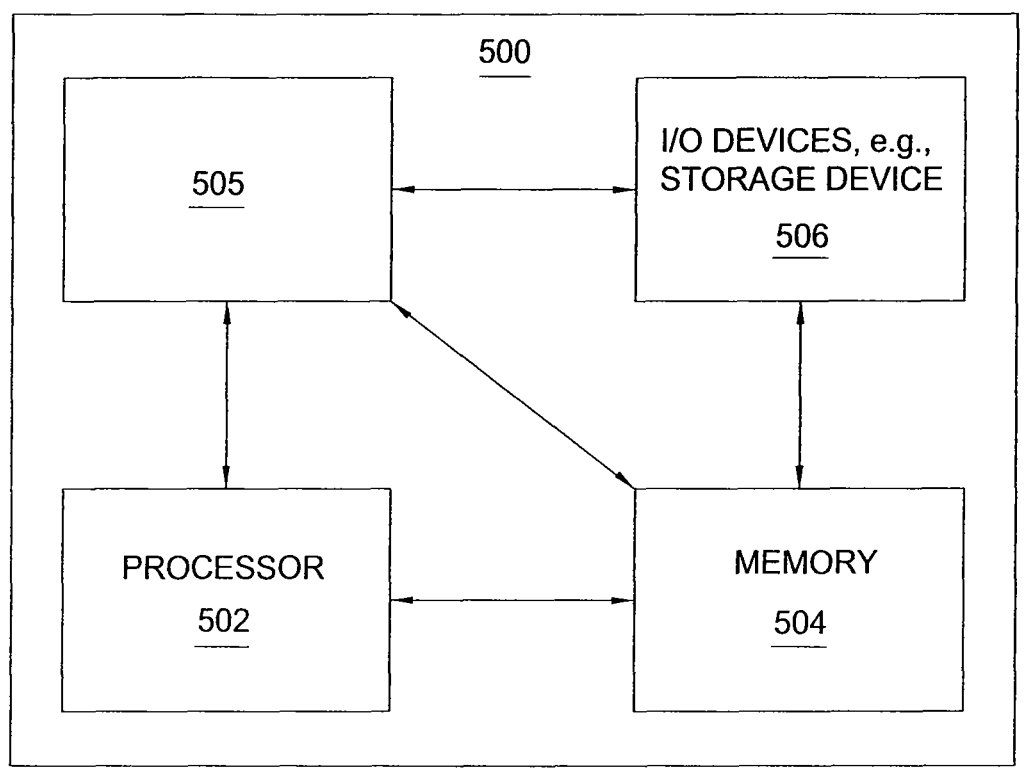
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for detecting relocation of an endpoint device for Voice over Internet Protocol (VoIP) services, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for detecting relocation of an endpoint device for Voice over Internet Protocol (VoIP) services can be loaded into memory 504 and executed by processor 502 to implement the functions as discussed above. As such, the present method 505 for detecting relocation of an endpoint device for Voice over Internet Protocol (VoIP) services (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a relocation of a customer endpoint device, comprising:

receiving, by a processor, a report of a detected inertial movement of the customer endpoint device when the customer endpoint device is activated, wherein the inertial movement is recorded in a memory of the customer endpoint device that is maintained by a secondary power source and the report of the detected inertial movement comprises a degree of motion, a date and a time of the detected inertial movement, wherein the customer endpoint device comprises an enhanced 911 voice over internet protocol endpoint device;

resetting, by the processor, the memory of the customer endpoint device after the report of the detected inertial movement is received;

receiving, by the processor, a report of a power loss event associated with the customer endpoint device only when the report of the detected inertial movement is also received, wherein the report of the power loss event comprises a type of power loss, a duration of the power loss, a time and a date;

determining, by the processor, a previous source internet protocol address used by the customer endpoint device;

obtaining, by the processor, a record of a last check-in message from the customer endpoint device;

determining, by the processor, that the relocation of the customer endpoint device has occurred using the report of the detected inertial movement, the report of the power loss event, the previous source internet protocol address and the record of the last check-in message; and intercepting, by the processor, a voice over internet protocol service of the customer endpoint device until a customer address is obtained.

2. The method of claim 1, wherein the report of the power loss event or the report of the detected inertial movement is received automatically.

3. The method of claim 1, wherein the report of the power loss event or the report of the detected inertial movement is received as a response to a query.

4. The method of claim 1, further comprising:

intercepting the voice over internet protocol service until a customer address is validated in addition to obtaining the customer address.

5. A non-transitory computer-readable medium to store a plurality of instructions which, when executed by a processor, cause the processor to perform operations for determining a relocation of a customer endpoint device, the operations comprising:

receiving a report of a detected inertial movement of the customer endpoint device when the customer endpoint device is activated, wherein the inertial movement is recorded in a memory of the customer endpoint device that is maintained by a secondary power source and the report of the detected inertial movement comprises a degree of motion, a date and a time of the detected inertial movement, wherein the customer endpoint device comprises an enhanced 911 voice over internet protocol endpoint device;

resetting the memory of the customer endpoint device after the report of the detected inertial movement is received;

receiving a report of a power loss event associated with the customer endpoint device only when the report of the detected inertial movement is also received, wherein the report of the power loss event comprises a type of power loss, a duration of the power loss, a time and a date;

determining a previous source internet protocol address used by the customer endpoint device;

obtaining a record of a last check-in message from the customer endpoint device;

determining that the relocation of the customer endpoint device has occurred using the report of the detected inertial movement, the report of the power loss event, the previous source internet protocol address and the record of the last check-in message; and intercepting a voice over internet protocol service of the customer endpoint device until a customer address is obtained.

6. A method for determining a relocation of a customer endpoint device, comprising:

detecting, by a processor, an inertial movement of the customer endpoint device;

recording, by the processor, the inertial movement as a report of a detected inertial movement in a memory of the customer endpoint device that is maintained by a secondary power source and the report of the detected inertial movement comprises a degree of motion, a date and a time of the detected inertial movement, wherein the customer endpoint device comprises an enhanced 911 voice over internet protocol endpoint device;

detecting, by the processor, a power loss event of the customer endpoint device only when the inertial movement of the customer endpoint device is also detected, wherein the report of the power loss event comprises a type of power loss, a duration of the power loss, a time and a date;

detecting, by the processor, a change in an internet protocol address used by the customer endpoint device by comparing the internet protocol address used to make a call with a previously stored internet protocol address;

sending, by the processor, the report of the detected inertial movement, the power loss event and the internet protocol address to a network application server for determining whether the relocation of the customer endpoint device has occurred when the customer endpoint device is activated, wherein a voice over internet protocol service of the customer endpoint device is intercepted by the network application server until a customer address is obtained; and receiving, by the processor, a signal to reset the memory of the customer endpoint device from the network application server after the report of the detected inertial movement is sent to the network application server.

7. The non-transitory computer-readable medium of claim 5, further comprising:

intercepting the voice over internet protocol service until a customer address is validated in addition to obtaining the customer address.

* * * * *